United States Patent
Endo et al.

(10) Patent No.: US 12,287,152 B2
(45) Date of Patent: Apr. 29, 2025

(54) HEAT PIPE, HEAT EXCHANGE DEVICE, AND METHOD FOR MANUFACTURING HEAT PIPE

(71) Applicant: HONDA MOTOR CO., LTD., Tokyo (JP)

(72) Inventors: Tsuneo Endo, Saitama (JP); Yuta Kurosawa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 190 days.

(21) Appl. No.: 18/128,735

(22) Filed: Mar. 30, 2023

(65) Prior Publication Data

US 2023/0314089 A1 Oct. 5, 2023

(30) Foreign Application Priority Data

Mar. 31, 2022 (JP) .................... 2022-061346
Oct. 28, 2022 (JP) .................... 2022-173686

(51) Int. Cl.
*F28D 15/04* (2006.01)
*B23P 15/26* (2006.01)

(52) U.S. Cl.
CPC ........... *F28D 15/046* (2013.01); *B23P 15/26* (2013.01); *B23P 2700/09* (2013.01)

(58) Field of Classification Search
CPC ........ F28D 15/04; F28D 15/046; F28D 15/02; F28D 15/0233; B23P 15/26; B23P 2700/09
See application file for complete search history.

(56) References Cited

U.S. PATENT DOCUMENTS

| | | | |
|---|---|---|---|
| 2008/0105406 A1* | 5/2008 | Chang | B23P 15/26 165/146 |
| 2012/0227933 A1* | 9/2012 | Chen | B21D 53/06 29/890.032 |
| 2012/0227935 A1* | 9/2012 | Huang | B21D 41/04 29/890.032 |

FOREIGN PATENT DOCUMENTS

| | | | | |
|---|---|---|---|---|
| JP | 2004077120 A | * | 3/2004 | ......... F28D 15/0233 |
| JP | 2004245550 A | * | 9/2004 | ......... F28D 15/0233 |
| JP | 5323614 B2 | | 10/2013 | |
| JP | 2020038051 A | * | 3/2020 | |

* cited by examiner

*Primary Examiner* — Tho V Duong
(74) *Attorney, Agent, or Firm* — Paratus Law Group, PLLC

(57) ABSTRACT

A heat pipe including: a heat receiving chamber; a heat dissipation chamber; a tubular connecting pipe; and wicks. Each of the heat receiving chamber and the heat dissipation chamber has, when viewed from a first direction, a greater width in a second direction than a width of the connecting pipe in the second direction. The wicks are formed side by side at least in the second direction. The wicks are formed in a groove shape on inner wall surfaces of the heat receiving chamber, the heat dissipation chamber, and the connecting pipe. At least one of the wicks has a bent portion on the heat receiving chamber side, which is bent in the second direction in the heat receiving chamber and the heat dissipation chamber. The heat receiving chamber, the heat dissipation chamber, the connecting pipe. The wicks are integrally formed by laminating and shaping using a metal powder.

6 Claims, 4 Drawing Sheets

HEAT PIPE, HEAT EXCHANGE DEVICE, AND METHOD FOR MANUFACTURING HEAT PIPE

CROSS-REFERENCE TO RELATED APPLICATIONS

This application is based upon and claims the benefit of priority from Japanese Patent Application No. 2022-061346, filed Mar. 31, 2022, and Japanese Patent Application No. 2022-173686, filed Oct. 28, 2022, the entire contents of which are incorporated herein by reference.

TECHNICAL FIELD

The present disclosure relates to a heat pipe which is a type of a heat exchanger, a heat exchange device including the heat pipe, and a method for manufacturing the heat pipe.

BACKGROUND ART

In the related art, a heat pipe as one type of a heat exchanger is known. For example, Japanese Patent No. 5323614 proposes a heat pipe in which cross-sectional areas of a heat receiving portion and a heat dissipation portion are larger than a cross-sectional area of a connecting portion.

In recent years, in order to allow more people to secure access to affordable, reliable, sustainable, and advanced energy, many researches and developments are actively conducted to contribute to the energy efficiency. There is a need for the improved heat exchange efficiency in the heat exchanger including the heat pipes to contribute to energy efficiency.

However, in the heat pipe of Japanese Patent No. 5323614, the heat dissipation portion, the heat receiving portion, the connection portion, and the like are each configured as separate parts, and accordingly, it is necessary to assemble these parts to manufacture the heat pipe, making the manufacturing process complicate, and also increasing the size (thickness). In addition, the wicks mainly responsible for heat dissipation are concentrated in the center of the cross section of the heat pipe, making it difficult to efficiently perform heat input and heat dissipation.

SUMMARY

The present disclosure provides a heat pipe with improved heat exchange efficiency and a method for manufacturing the heat pipe.

According to an aspect of the present disclosure, there is provided a heat pipe including: a heat receiving chamber; a heat dissipation chamber; a tubular connecting pipe communicating between the heat receiving chamber and the heat dissipation chamber; and a plurality of wicks extending inside the heat receiving chamber, the heat dissipation chamber, and the connecting pipe, in which: a refrigerant flows inside the heat receiving chamber, the heat dissipation chamber, and the connecting pipe; the heat receiving chamber has, when viewed from a first direction perpendicular to a longitudinal direction of the connecting pipe, a greater width in a second direction perpendicular to both the longitudinal direction and the first direction of the connecting pipe than a width of the connecting pipe in the second direction; the heat dissipation chamber has, when viewed from the first direction, a greater width in the second direction than the width of the connecting pipe in the second direction; the plurality of wicks are formed side by side at least in the second direction; the wicks are formed in a groove shape on inner wall surfaces of the heat receiving chamber, the heat dissipation chamber, and the connecting pipe; at least one of the wicks has a bent portion on the heat receiving chamber side, which is bent in the second direction in the heat receiving chamber when viewed from the first direction; at least one of the wicks has a bent portion on the heat dissipation chamber side, which is bent in the second direction in the heat dissipation chamber when viewed from the first direction; the wicks adjacent to each other in the second direction have an interval in the heat receiving chamber and an interval in the heat dissipation chamber which are wider than an interval in the connecting pipe; and the heat receiving chamber, the heat dissipation chamber, the connecting pipe, and the wicks are integrally formed by laminating and shaping using a metal powder.

According to another aspect of the present disclosure, there is provided a method for manufacturing a heat pipe including: a heat receiving chamber; a heat dissipation chamber; a tubular connecting pipe communicating between the heat receiving chamber and the heat dissipation chamber; and a plurality of wicks extending inside the heat receiving chamber, the heat dissipation chamber, and the connecting pipe, wherein: the heat receiving chamber has, when viewed from a first direction perpendicular to a longitudinal direction of the connecting pipe, a greater width in a second direction perpendicular to both the longitudinal direction and the first direction of the connecting pipe than a width of the connecting pipe in the second direction; the heat dissipation chamber has, when viewed from the first direction, a greater width in the second direction than the width of the connecting pipe in the second direction; the plurality of wicks are formed side by side at least in the second direction; the wicks are formed in a groove shape on inner wall surfaces of the heat receiving chamber, the heat dissipation chamber, and the connecting pipe; at least one of the wicks has a bent portion on the heat receiving chamber side, which is bent in the second direction in the heat receiving chamber when viewed from the first direction; at least one of the wicks has a bent portion on the heat dissipation chamber side, which is bent in the second direction in the heat dissipation chamber when viewed from the first direction; the wicks adjacent to each other in the second direction have an interval in the heat receiving chamber and an interval in the heat dissipation chamber which are wider than an interval in the connecting pipe; a refrigerant flows inside the heat receiving chamber, the heat dissipation chamber, and the connecting pipe; and the method comprises integrally forming the heat receiving chamber, the heat dissipation chamber, the connecting pipe, and the wicks by laminating and shaping using a metal powder.

According to the present disclosure, by laminating and shaping using a metal powder, it is possible to integrally form the heat receiving chamber, the heat dissipation chamber, the connecting pipe, and the wicks with increased surface areas of the heat receiving chamber and the heat dissipation chamber, and accordingly, heat exchange efficiency of the heat pipe is improved.

DESCRIPTION OF EMBODIMENTS

Figure 1:
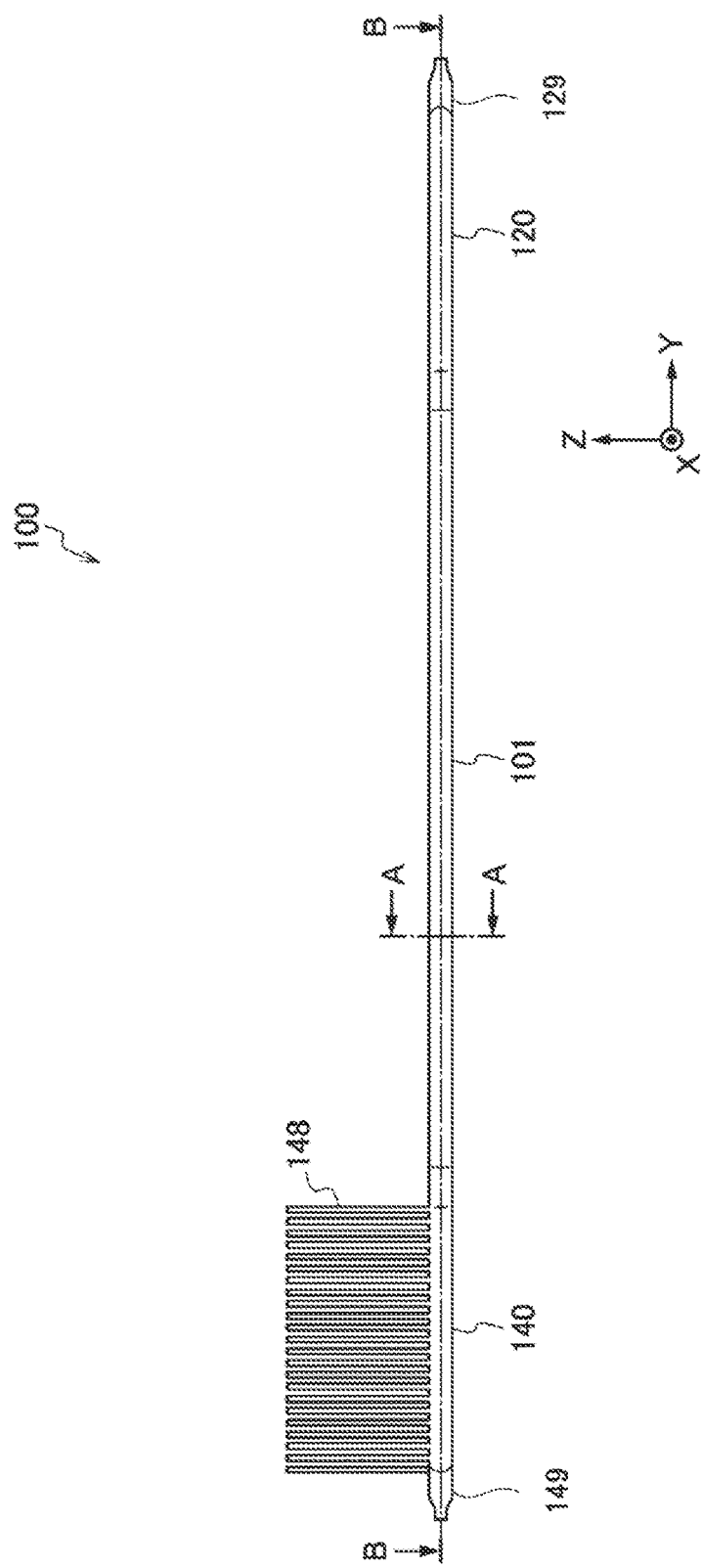
FIG. 1 is a side view of a heat pipe of an embodiment.

Hereinafter, an embodiment of a heat pipe of the present disclosure will be described below with reference to the accompanying drawings. It is assumed that drawings are viewed in direction of the reference numerals.

FIG. 1 is a side view of a heat pipe 100 according to an embodiment of the present disclosure. The heat pipe 100 is a device for transferring heat from a local heat source (for example, an arithmetic processing unit and the like of a computer) to a heat dissipation portion spaced away from the heat source to lower the temperature of the heat source. As shown in FIG. 1, the heat pipe 100 of the embodiment includes a heat receiving chamber 120, a heat dissipation chamber 140, and a tubular connecting pipe 101 communicating between the heat receiving chamber 120 and the heat dissipation chamber 140.

In this description, an XYZ orthogonal coordinate system indicating directions with respect to the heat pipe 100 is set for the sake of simplicity and clarity of explanation. The XYZ orthogonal coordinate system includes an X-axis along a width direction of the heat pipe 100, a Y-axis along a longitudinal direction of the heat pipe 100 (the connecting pipe 101), and a Z-axis along a height direction orthogonal to both the X-axis and the Y-axis. A first direction, which will be described below, corresponds to the Z-axis direction, and a second direction corresponds to the X-axis direction.

Figure 2:
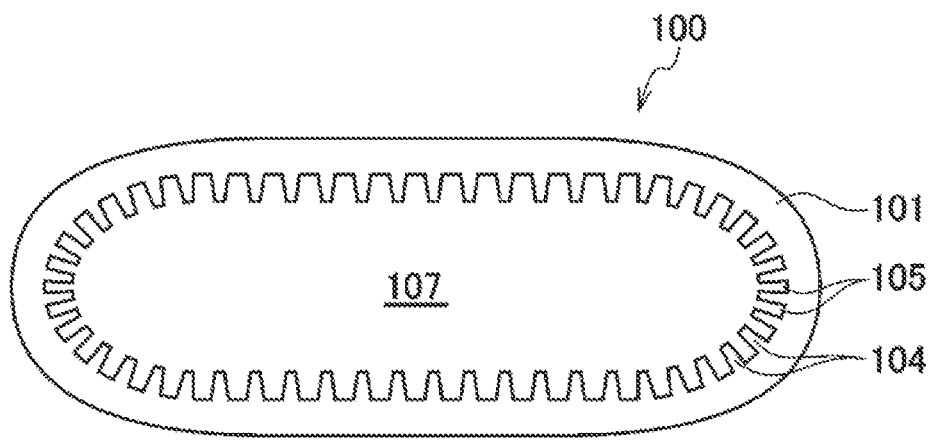
FIG. 2 is a cross-sectional view taken along line A-A of FIG. 1.
Figure 2:
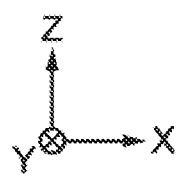

FIG. 2 is a cross-sectional view taken along line A-A of FIG. 1 and shows the inside of the connecting pipe 101. The heat pipe 100 further includes a plurality of wicks 105 extending inside the connecting pipe 101 as shown in the drawing. The wicks 105 are formed around an inner space 107 of the connecting pipe 101. Each wick 105 also extends inside the heat receiving chamber 120 and the heat dissipation chamber 140.

In the heat pipe 100, a predetermined refrigerant (for example, pure water) is sealed and flows in a vacuumed interior of the heat receiving chamber 120, the heat dissipation chamber 140, and the connecting pipe 101. In the heat receiving chamber 120 disposed adjacent to the heat source, the refrigerant receives heat, and the vaporized refrigerant (water vapor in the case of the pure water) is moved to the heat dissipation chamber 140 at the speed of sound and releases heat in the heat dissipation chamber 140. The refrigerant converted back into liquid by the heat release is moved through the wicks 105 under the action of surface tension and returns to the heat receiving chamber 120, whereby thermal energy is transferred.

Figure 3:
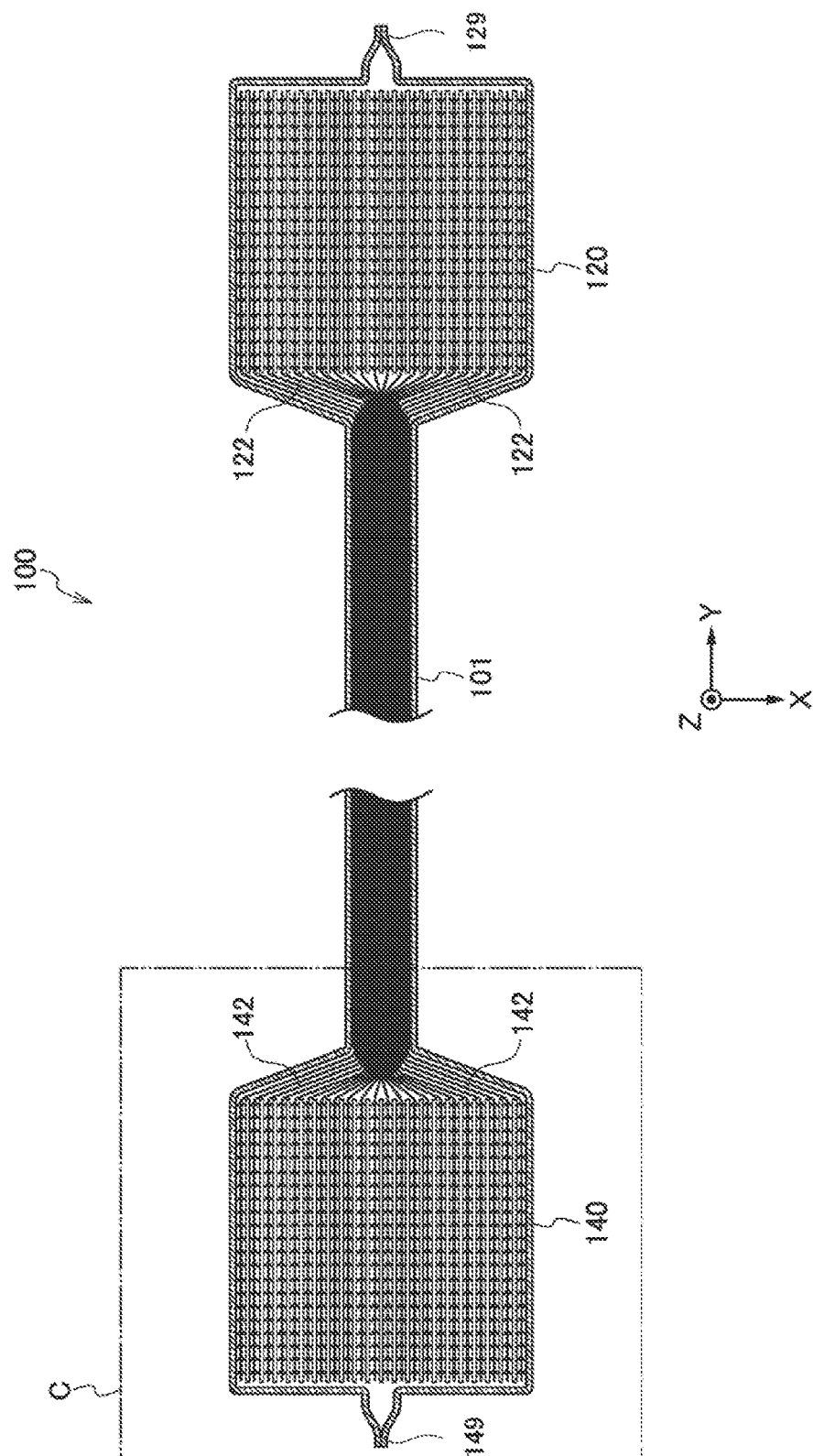
FIG. 3 is a cross-sectional view taken along line B-B of FIG. 1.

FIG. 3 is a cross-sectional view taken along the line B-B in FIG. 1, and corresponds to a cross section of the heat pipe 100 viewed from the first direction perpendicular to the longitudinal direction (Y-axis direction) of the connecting pipe 101, that is, from the Z-axis direction. As is evident from the drawing, when viewed from the first direction perpendicular to the longitudinal direction of the connecting pipe 101, the heat receiving chamber 120 has a greater width in the second direction perpendicular to both the longitudinal direction of the connecting pipe 101 and the first direction, that is, has a greater width in the X-axis direction, than a width of the connecting pipe 101 in the second direction. The heat dissipation chamber 140 also has a shape similar to that of the heat receiving chamber 120, and when viewed from the first direction, the heat dissipation chamber 140 has a greater width in the second direction than the width of the connecting pipe 101 in the second direction.

The plurality of wicks 105 are formed side by side at least in the second direction (X-axis direction). That is, as is evident from FIGS. 1 and 2, the overall shape of the heat pipe 100 has a flat shape with a smaller length in the first direction, that is, in the Z-axis direction. Therefore, by forming the plurality of wicks 105 side by side at least in the second direction, many wicks 105 can be arranged. However, in this embodiment, the wicks 105 are also formed side by side in the first direction.

The wicks 105 are formed in a groove shape on inner wall surfaces of the heat receiving chamber 120, the heat dissipation chamber 140, and the connecting pipe 101. The groove shape is sized so as to allow the refrigerant to move from the heat dissipation chamber 140 to the heat receiving chamber 120 through the connecting pipe 101 by capillary action. As shown in FIG. 2, in the connecting pipe 101, each wick 105 includes grooves formed between a plurality of partition walls 104 protruding from the inner wall of the connecting pipe 101 that defines the inner space 107 of the connecting pipe 101.

Figure 4:
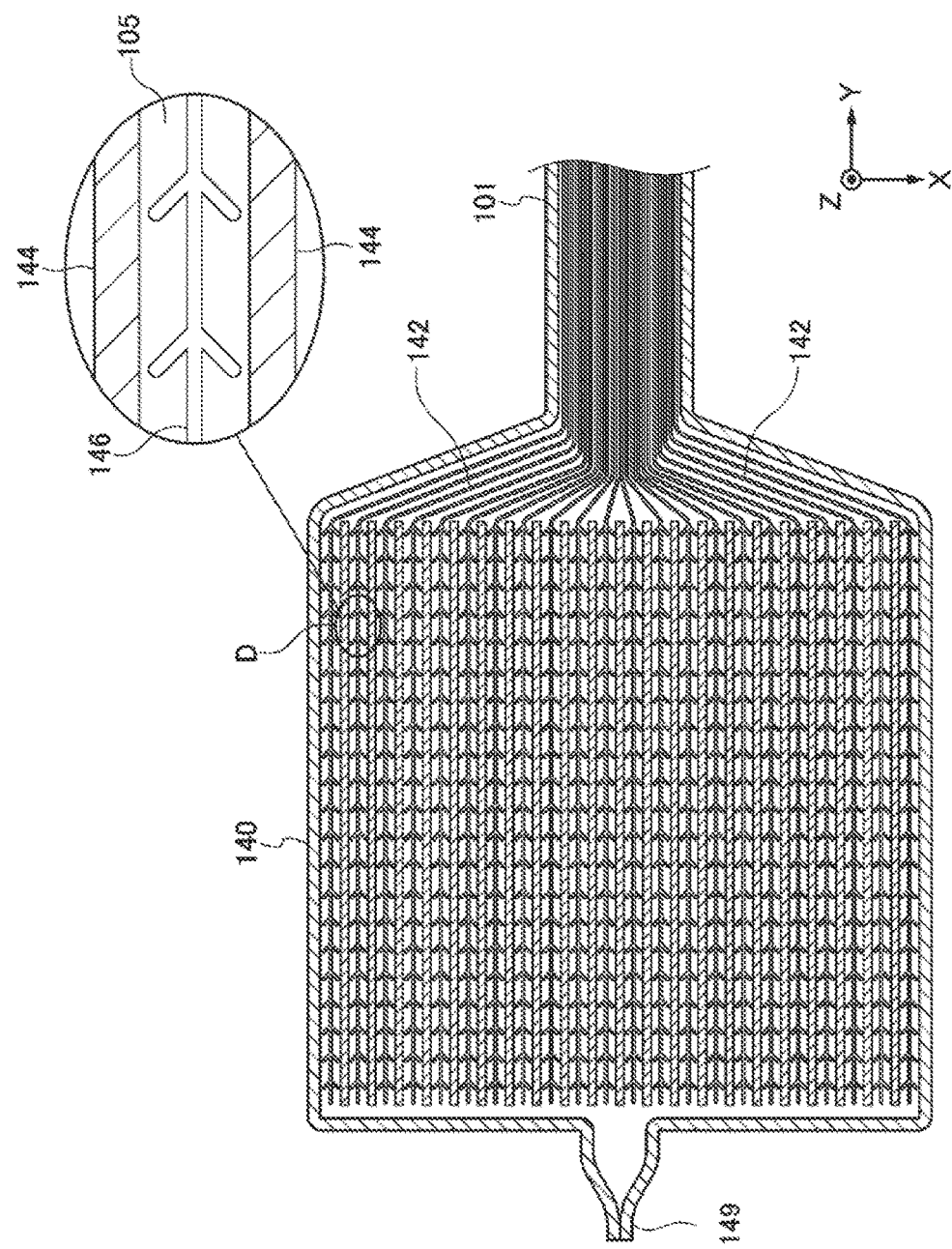
FIG. 4 is an enlarged view of a region C in FIG. 3.

FIG. 4 is an enlarged view of a region C in FIG. 3 and an enlarged view of the heat dissipation chamber 140. At least one wick 105 has a bent portion 142 on the heat dissipation chamber side, which is bent in the second direction in the heat dissipation chamber 140 when viewed from the first direction. The heat receiving chamber 120 has the same configuration as the heat dissipation chamber 140, and at least one wick 105 has a bent portion 122 on the heat receiving chamber side (see FIG. 3), which is bent in the second direction in the heat receiving chamber 120 when viewed from the first direction. As a result, the wicks 105 adjacent to each other in the second direction have an interval in the heat receiving chamber 120 and an interval in the heat dissipation chamber 140 which are wider than an interval in the connecting pipe 101.

The heat receiving chamber 120, the heat dissipation chamber 140, the connecting pipe 101, and the wicks 105 are integrally manufactured by additive manufacturing technology (hereinafter, referred to as AM technology) which can manufacture parts with 3D complex shapes by laminating and solidifying metal powder material layer by layer. Accordingly, it is possible to manufacture fine and complicated three-dimensional shaped components, which are difficult to manufacture with the related methods such as machining and casting.

Specifically, according to the heat pipe 100 of the embodiment, by laminating and shaping using a metal powder with AM technology, it is possible to integrally form the heat receiving chamber 120, the heat dissipation chamber 140, the connecting pipe 101, and the wicks 105 with increased surface areas of the heat receiving chamber 120 and the heat dissipation chamber 140, and accordingly, the heat exchange efficiency of the heat pipe is improved.

In addition, since substantially all the members of the heat pipe 100 can be integrally formed by laminating and shaping using a metal powder with the AM technology, the manufacturing process can be simplified.

Moreover, as described above, the plurality of wicks 105 are formed not only in the second direction but also in the first direction, and as a result, the plurality of wicks 105 are formed along the entire circumference of the entire inner wall surfaces of the heat receiving chamber 120, the heat dissipation chamber 140, and the connecting pipe 101. As a result, the surface areas of the heat receiving chamber 120 and the heat dissipation chamber 140 can be further increased, and the heat exchange efficiency of the heat pipe 100 is further improved.

Furthermore, FIG. 4 shows an enlarged view of the region D. The heat dissipation chamber 140 is provided with partition walls 144 on the heat dissipation chamber side, which protrude from the inner wall surface and extend between the wicks 105 adjacent to each other in the second direction. The heat receiving chamber 120 has the same configuration as the heat dissipation chamber 140, and is provided with partition walls (not shown) on the heat receiving chamber side, which protrude from the inner wall surface and extend between the wicks 105 adjacent to each other in the second direction. The partition walls on the heat receiving chamber side and the partition walls 144 on the heat dissipation chamber side integrally extend along the longitudinal direction (Y-axis) of the heat pipe 100 via the partition walls 104 shown in FIG. 2. However, when the partition walls on the heat receiving chamber side and the partition walls 144 on the heat dissipation chamber side are provided in the bent portion 122 on the heat receiving chamber side and the bent portion 142 on the heat dissipation chamber side, the partition walls on the heat receiving chamber side and the partition walls 144 on the heat dissipation chamber side are also bent in the second direction together with the wicks 105. The heat receiving chamber 120, the heat dissipation chamber 140, the connecting pipe 101, the wicks 105, the partition walls on the heat receiving chamber side, and the partition walls 144 on the heat dissipation chamber side are integrally formed by laminating and shaping using a metal powder with the AM technology.

As a result, with the partition walls on the heat receiving chamber side, the rigidity of the heat receiving chamber 120 is improved and the heat transfer property of the heat receiving chamber is also improved. Likewise, with the partition walls 144 on the heat dissipation chamber side, the rigidity of the heat dissipation chamber 140 is improved and the heat dissipation of the heat dissipation chamber 140 is also improved. In addition, even when the heat pipe 100 is tilted or vibrated, because the partition walls on the heat receiving chamber side allow the refrigerant to be more uniformly distributed in the heat receiving chamber 120, the heat transfer property of the heat receiving chamber is improved. Likewise, even when the heat pipe 100 is tilted or vibrated, because the partition walls 144 on the heat dissipation chamber side allow the refrigerant to be more uniformly distributed in the heat dissipation chamber 140, the heat dissipation of the heat dissipation chamber 140 is improved.

Further, in the heat dissipation chamber 140, branched grooves 146 including straight grooves and branch grooves branched off from the straight grooves are formed on bottom surfaces of the wicks 105. These branched grooves 146 are also formed in the heat receiving chamber 120. Because the refrigerant can be conveyed due to the straight grooves of the branched grooves 146 and the grooves can also be arranged densely due to the branch grooves, the heat exchange efficiency of the heat exchange device is improved. The shape of the grooves is not limited to the branched grooves 146, and any groove shape such as a zigzag groove, an uneven groove, or the like can be adopted.

Returning to FIG. 1, a heat sink 148 including a plurality of fins is formed outside the heat dissipation chamber 140 in the housing forming the outer shell of the heat dissipation chamber 140. The heat receiving chamber 120, the heat dissipation chamber 140, the connecting pipe 101, the wicks 105, and the heat sink 148 may be integrally formed by laminating and shaping using a metal powder with the AM technology.

As a result, the heat sink 148 including a plurality of fins outside the heat dissipation chamber 140 is integrally formed on the housing of the heat dissipation chamber 140, so that the heat dissipation of the heat dissipation chamber 140 is improved, and the heat exchange efficiency of the heat exchange device is improved.

Further, as shown in FIGS. 1, 3, and 4, the heat receiving chamber 120 and the heat dissipation chamber 140 are provided with vacuuming units 129 and 149 on surfaces opposite to the connecting pipe 101, respectively. The vacuuming units 129 and 149 are communication holes communicating between the outside and the inside before sealing, and are sealed after vacuuming. The vacuuming units 129 and 149 are used at the time of vacuuming in which a refrigerant is injected from one side and sucked from the other side to vacuum the inside, for example. The vacuuming units 129 and 149 are preferably provided on an imaginary line extending in the longitudinal direction of the heat pipe 100 (the connecting pipe 101) through the center of the connecting pipe 101 in the second direction.

In addition, when the heat pipe 100 is manufactured using the AM technology, the metal powder accumulated inside is discharged through the communication hole before vacuuming. For example, water is injected from one side and the metal powder is discharged from the other side together with the water. As a result, it is not necessary to provide a dedicated structure for discharging the metal powder, the structure can be simplified, and the number of processing times for sealing can be reduced. Furthermore, the vacuuming units 129 and 149 may also be used in a cleaning process of the heat pipe 100 in which, after the metal powder is discharged, water is injected from one side and discharged from the other side.

Although the embodiment of the present disclosure has been described above with reference to the accompanying drawings, it goes without saying that the present disclosure is not limited to such an embodiment. It will be apparent that those skilled in the art, within the scope described in the claims, can come up with various kinds of modification examples, or modifications, which are naturally within the technical scope of the present disclosure. In addition, the components in the embodiment described above may be arbitrarily combined without departing from the spirit of the disclosure.

For example, in this embodiment, it is described that the heat sink 148 including a plurality of fins is formed outside the heat dissipation chamber 140 in the housing forming the outer shell of the heat dissipation chamber 140, but the heat sink 148 may be omitted. Further, the heat sink 148 may be provided in the heat dissipation chamber 140 separately from the heat dissipation chamber 140.

At least the following characteristics have been described herein. While the corresponding components and the like in the embodiments described above are indicated in parenthesis, embodiments are not limited thereto.

(1) A heat pipe (the heat pipe 100) including: a heat receiving chamber (the heat receiving chamber 120); a heat dissipation chamber (the heat dissipation chamber 140); a tubular connecting pipe (the connecting pipe 101) communicating between the heat receiving chamber and the heat dissipation chamber; and a plurality of wicks (the wicks 105) extending inside the heat receiving chamber, the heat dissipation chamber, and the connecting pipe, in which a refrigerant flows inside the heat receiving chamber, the heat dissipation chamber, and the connecting pipe, the heat receiving chamber has, when viewed from a first direction perpendicular to a longitudinal direction of the connecting pipe, a greater width in a second direction perpendicular to both the longitudinal direction and the first direction of the connecting pipe than a width of the connecting pipe in the second direction, the heat dissipation chamber has, when viewed from the first direction, a greater width in the second direction than the width of the connecting pipe in the second direction, the plurality of wicks are formed side by side at least in the second direction, the wicks are formed in a groove shape on inner wall surfaces of the heat receiving chamber, the heat dissipation chamber, and the connecting pipe, at least one of the wicks has a bent portion on the heat receiving chamber side (the bent portion 122 on the heat receiving chamber side), which is bent in the second direction in the heat receiving chamber when viewed from the first direction, at least one of the wicks has a bent portion on the heat dissipation chamber side (the bent portion 142 on the heat dissipation chamber side), which is bent in the second direction in the heat dissipation chamber when viewed from the first direction, the wicks adjacent to each other in the second direction have an interval in the heat receiving chamber and an interval in the heat dissipation chamber which are wider than an interval in the connecting pipe, and the heat receiving chamber, the heat dissipation chamber, the connecting pipe, and the wicks are integrally formed by laminating and shaping using a metal powder.

According to (1), by laminating and shaping using a metal powder, it is possible to integrally form the heat receiving chamber, the heat dissipation chamber, the connecting pipe, and the wicks with increased surface areas of the heat receiving chamber and the heat dissipation chamber, and accordingly, the heat exchange efficiency of the heat pipe is improved.

(2) The heat pipe according to (1), in which the plurality of wicks are formed along an entire circumference of inner wall surfaces of the heat receiving chamber, the heat dissipation chamber, and the connecting pipe.

According to (2), the surface areas of the heat receiving chamber and the heat dissipation chamber can be further increased, and the heat exchange efficiency of the heat pipe is further improved.

(3) The heat pipe according to (1) or (2), in which the heat receiving chamber is provided with partition walls on the heat receiving chamber side, which protrude from the inner wall surface and extend between the wicks adjacent to each other in the second direction, the heat dissipation chamber is provided with partition walls on the heat dissipation chamber side (the partition walls 144 on the heat dissipation chamber side), which protrude from the inner wall surface and extend between the wicks adjacent to each other in the second direction, and the heat receiving chamber, the heat dissipation chamber, the connecting pipe, the wicks, the partition walls on the heat receiving chamber side, and the partition walls on the heat dissipation chamber side are integrally formed by laminating and shaping using a metal powder.

According to (3), with the partition walls on the heat receiving chamber side, the rigidity of the heat receiving chamber is improved and the heat transfer property of the heat receiving chamber is also improved. Likewise, with the partition walls on the heat dissipation chamber side, the rigidity of the heat dissipation chamber is improved and the heat dissipation of the heat dissipation chamber is also improved. In addition, even when the heat pipe is tilted or vibrated, because the partition walls on the heat receiving chamber side allow the refrigerant to be more uniformly distributed in the heat receiving chamber, the heat transfer property of the heat receiving chamber is improved. Likewise, even when the heat pipe is tilted or vibrated, because the partition walls on the heat dissipation chamber side allow the refrigerant to be more uniformly distributed in the heat dissipation chamber, the heat dissipation of the heat dissipation chamber is improved.

(4) A heat exchange device including the heat pipe according to any one of (1) to (3), in which a heat sink (the heat sink 148) including a plurality of fins is formed outside the heat dissipation chamber in a housing of the heat dissipation chamber, and the heat receiving chamber, the heat dissipation chamber, the connecting pipe, the wicks, and the heat sink are integrally formed by laminating and shaping using a metal powder.

According to (4), a heat sink including a plurality of fins outside the heat dissipation chamber is integrally formed on the housing of the heat dissipation chamber, so that the heat dissipation of the heat dissipation chamber is improved, and the heat exchange efficiency of the heat exchange device is improved.

(5) A method for manufacturing a heat pipe (the heat pipe 100) including: a heat receiving chamber (the heat receiving chamber 120); a heat dissipation chamber (the heat dissipation chamber 140); a tubular connecting pipe (the connecting pipe 101) communicating between the heat receiving chamber and the heat dissipation chamber; and a plurality of wicks (the wicks 105) extending inside the heat receiving chamber, the heat dissipation chamber, and the connecting pipe, in which the heat receiving chamber has, when viewed from a first direction perpendicular to a longitudinal direction of the connecting pipe, a greater width in a second direction perpendicular to both the longitudinal direction and the first direction of the connecting pipe than a width of the connecting pipe in the second direction, the heat dissipation chamber has, when viewed from the first direction, a greater width in the second direction than the width of the connecting pipe in the second direction, the plurality of wicks are formed side by side at least in the second direction, the wicks are formed in a groove shape on inner wall surfaces of the heat receiving chamber, the heat dissipation chamber, and the connecting pipe, at least one of the wicks has a bent portion on the heat receiving chamber side (the bent portion 122 on the heat receiving chamber side) bent in the second direction in the heat receiving chamber when viewed from the first direction, at least one of the wicks has a bent portion on the heat dissipation chamber side (the bent portion 142 on the heat dissipation chamber side) bent in the second direction in the heat dissipation chamber when viewed from the first direction, the wicks adjacent to each other in the second direction have an interval in the heat receiving chamber and an interval in the heat dissipation chamber which are wider than an interval in the connecting pipe, a refrigerant flows inside the heat receiving chamber, the heat dissipation chamber, and the connecting pipe, and the method includes integrally forming the heat receiving chamber, the heat dissipation chamber, the connecting pipe, and the wicks by laminating and shaping using a metal powder.

According to (5), by laminating and shaping using a metal powder, it is possible to integrally form the heat receiving chamber, the heat dissipation chamber, the connecting pipe, and the wicks with increased surface areas of the heat receiving chamber and the heat dissipation chamber, and accordingly, the heat exchange efficiency of the heat pipe is improved.

(6) The method for manufacturing the heat pipe according to (5), further including: integrally forming communication holes communicating with the outside in the heat receiving chamber and the heat dissipation chamber; removing the metal powder from the communication hole; injecting the refrigerant from the communication hole and vacuuming; and sealing the communication hole after the vacuuming.

According to (6), by discharging the remaining metal powder using the communication hole for vacuuming, it is not necessary to provide a dedicated structure for discharging the metal powder, the structure can be simplified, and the number of processing times for sealing can be reduced.

The invention claimed is:

1. A heat pipe comprising:
a heat receiving chamber;
a heat dissipation chamber;
a tubular connecting pipe communicating between the heat receiving chamber and the heat dissipation chamber; and
a plurality of wicks extending inside the heat receiving chamber, the heat dissipation chamber, and the connecting pipe, wherein:
a refrigerant flows inside the heat receiving chamber, the heat dissipation chamber, and the connecting pipe;
the heat receiving chamber has, when viewed from a first direction perpendicular to a longitudinal direction of the connecting pipe, a greater width in a second direction perpendicular to both the longitudinal direction and the first direction of the connecting pipe than a width of the connecting pipe in the second direction;
the heat dissipation chamber has, when viewed from the first direction, a greater width in the second direction than the width of the connecting pipe in the second direction;
the plurality of wicks are formed side by side at least in the second direction;
the wicks are formed in a groove shape on inner wall surfaces of the heat receiving chamber, the heat dissipation chamber, and the connecting pipe;
at least one of the wicks has a bent portion on the heat receiving chamber side, which is bent in the second direction in the heat receiving chamber when viewed from the first direction;
at least one of the wicks has a bent portion on the heat dissipation chamber side, which is bent in the second direction in the heat dissipation chamber when viewed from the first direction;
the wicks adjacent to each other in the second direction have an interval in the heat receiving chamber and an interval in the heat dissipation chamber which are wider than an interval in the connecting pipe; and
the heat receiving chamber, the heat dissipation chamber, the connecting pipe, and the wicks are integrally formed by laminating and shaping using a metal powder.

2. The heat pipe according to claim 1, wherein the plurality of wicks are formed along an entire circumference of inner wall surfaces of the heat receiving chamber, the heat dissipation chamber, and the connecting pipe.

3. The heat pipe according to claim 1, wherein:
the heat receiving chamber is provided with partition walls on the heat receiving chamber side, which protrude from the inner wall surface and extend between the wicks adjacent to each other in the second direction;
the heat dissipation chamber is provided with partition walls on the heat dissipation chamber side, which protrude from an inner wall surface and extend between the wicks adjacent to each other in the second direction; and
the heat receiving chamber, the heat dissipation chamber, the connecting pipe, the wicks, the partition walls on the heat receiving chamber side, and the partition walls on the heat dissipation chamber side are integrally formed by laminating and shaping using a metal powder.

4. A heat exchange device comprising the heat pipe according to claim 1, wherein:
a heat sink including a plurality of fins is formed outside the heat dissipation chamber in a housing of the heat dissipation chamber; and
the heat receiving chamber, the heat dissipation chamber, the connecting pipe, the wicks, and the heat sink are integrally formed by laminating and shaping using a metal powder.

5. A method for manufacturing a heat pipe including:
a heat receiving chamber;
a heat dissipation chamber;
a tubular connecting pipe communicating between the heat receiving chamber and the heat dissipation chamber; and
a plurality of wicks extending inside the heat receiving chamber, the heat dissipation chamber, and the connecting pipe, wherein:
the heat receiving chamber has, when viewed from a first direction perpendicular to a longitudinal direction of the connecting pipe, a greater width in a second direction perpendicular to both the longitudinal direction and the first direction of the connecting pipe than a width of the connecting pipe in the second direction;
the heat dissipation chamber has, when viewed from the first direction, a greater width in the second direction than the width of the connecting pipe in the second direction;
the plurality of wicks are formed side by side at least in the second direction;
the wicks are formed in a groove shape on inner wall surfaces of the heat receiving chamber, the heat dissipation chamber, and the connecting pipe;
at least one of the wicks has a bent portion on the heat receiving chamber side, which is bent in the second direction in the heat receiving chamber when viewed from the first direction;
at least one of the wicks has a bent portion on the heat dissipation chamber side, which is bent in the second direction in the heat dissipation chamber when viewed from the first direction;
the wicks adjacent to each other in the second direction have an interval in the heat receiving chamber and an interval in the heat dissipation chamber which are wider than an interval in the connecting pipe;
a refrigerant flows inside the heat receiving chamber, the heat dissipation chamber, and the connecting pipe; and
the method comprises integrally forming the heat receiving chamber, the heat dissipation chamber, the connecting pipe, and the wicks by laminating and shaping using a metal powder.

6. The method for manufacturing a heat pipe according to claim 5, further comprising:
integrally forming communication holes communicating with the outside in the heat receiving chamber and the heat dissipation chamber;
removing the metal powder from the communication hole;
injecting the refrigerant from the communication hole and vacuuming; and
sealing the communication hole after the vacuuming.

* * * * *